US011211086B1

(12) United States Patent
Uefune et al.

(10) Patent No.: US 11,211,086 B1
(45) Date of Patent: Dec. 28, 2021

(54) EMBEDDED TAPE REEL LOCK MECHANISM FOR TAPE EMBEDDED STORAGE DRIVE

(71) Applicant: Western Digital Technologies, Inc., San Jose, CA (US)

(72) Inventors: Kouki Uefune, Kanagawa (JP); Toshio Takahashi, Tokyo (JP); Tomoki Hiramatsu, Kanagawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/184,550

(22) Filed: Feb. 24, 2021

Related U.S. Application Data

(60) Provisional application No. 63/088,770, filed on Oct. 7, 2020.

(51) Int. Cl.
   *G11B 23/28* (2006.01)
   *G11B 5/55* (2006.01)
   *G11B 5/78* (2006.01)

(52) U.S. Cl.
   CPC .......... *G11B 5/5508* (2013.01); *G11B 5/5573* (2013.01); *G11B 5/78* (2013.01)

(58) Field of Classification Search
   CPC ......... G11B 19/00; G11B 23/04; G11B 23/28; G08B 13/126
   USPC ...................................... 360/97.11, 132, 137
   See application file for complete search history.

(56) References Cited

U.S. PATENT DOCUMENTS

| | | | |
|---|---|---|---|
| 3,645,464 A | 2/1972 | Herger et al. | |
| 4,447,020 A | 5/1984 | Toi et al. | |
| 5,449,124 A | 9/1995 | Fujii | |
| 5,657,937 A | 8/1997 | Todd et al. | |
| 5,857,634 A | 1/1999 | Hertrich | |
| 6,318,657 B1 | 11/2001 | Nayak | |
| 7,677,488 B2 | 3/2010 | Hiraguchi | |
| 7,857,250 B2 * | 12/2010 | Takenoshita | ......... G11B 23/027 242/338.1 |
| 2014/0085800 A1 | 3/2014 | McIntosh et al. | |

OTHER PUBLICATIONS

"DLT 4000 Tape Drive Product Manual," Publication No. 81-60043-04, Quantum, Nov. 10, 2003, 300 pages, https://qsupport.quantum.com/freedownloads/dlt4000/dlt4000productmanual.pdf.

* cited by examiner

*Primary Examiner* — Nabil Z Hindi
(74) *Attorney, Agent, or Firm* — Patterson & Sheridan, LLP; Steven H. Versteeg

(57) ABSTRACT

The present disclosure generally relates to a lock mechanism for a tape embedded drive. The tape embedded drive comprises an enclosure enclosing a first tape reel, a second tape reel, and a lock mechanism. The first tape reel comprises a first gear, the second tape reel comprises a second gear, and the lock mechanism is disposed between the first and second gears. The lock mechanism comprises a latch lock, one or more latch tips disposed at a first end of the latch lock, a magnet disposed at a second end of the latch lock, and an electromagnet disposed adjacent to the magnet. When the electromagnet is activated, the latch lock moves to an unlocked position. When the electromagnet is de-activated, the latch lock moves to a locked position where the one or more latch tips are in contact with the first and second gears.

20 Claims, 10 Drawing Sheets

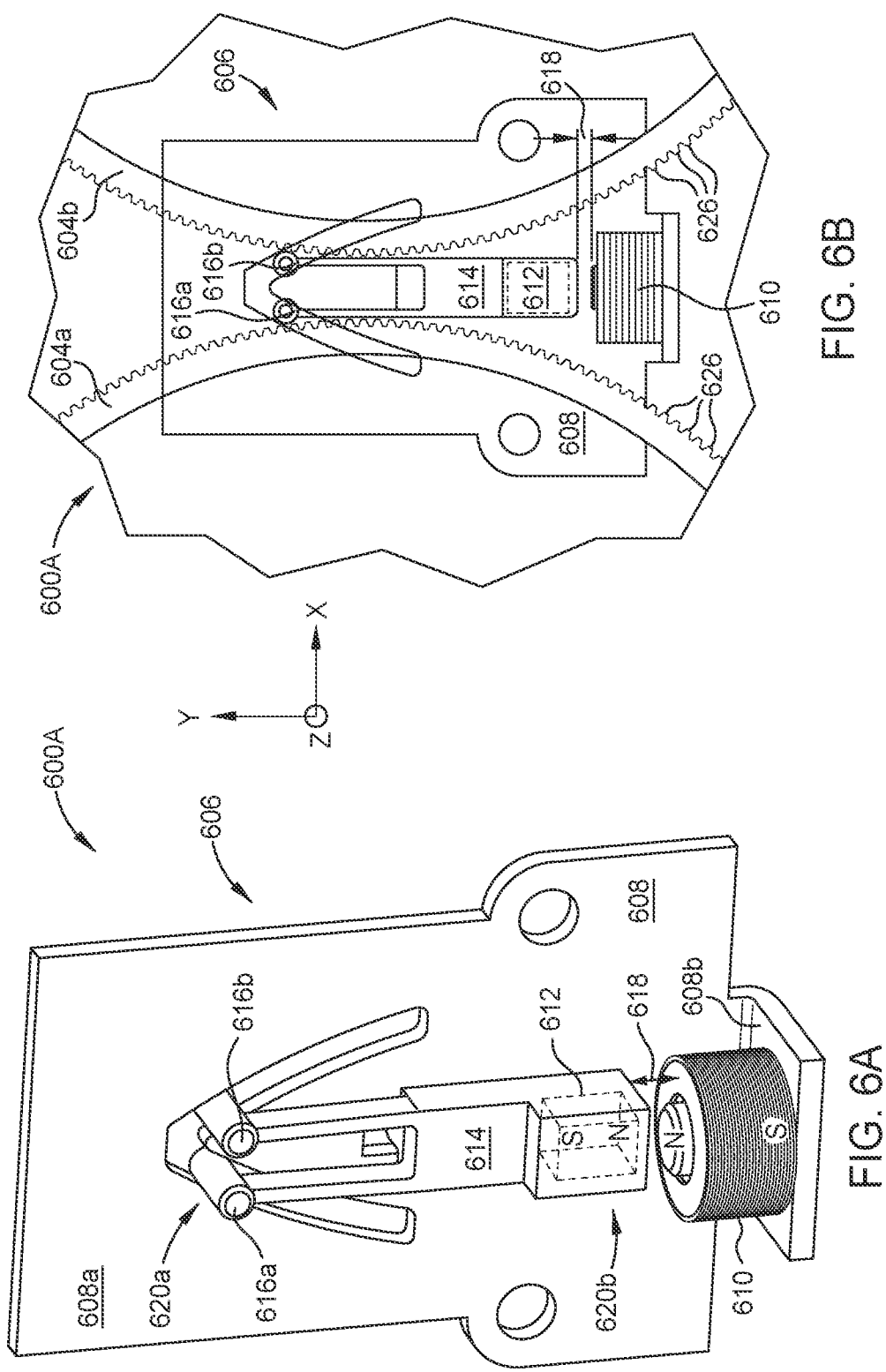

EMBEDDED TAPE REEL LOCK MECHANISM FOR TAPE EMBEDDED STORAGE DRIVE

CROSS-REFERENCE TO RELATED APPLICATIONS

This application claims benefit of U.S. provisional patent application Ser. No. 63/088,770, filed Oct. 7, 2020, which is herein incorporated by reference.

BACKGROUND OF THE DISCLOSURE

Field of the Disclosure

Embodiments of the present disclosure generally relate to a lock mechanism for a tape embedded drive.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head comprises servo elements and data elements that are arranged in an array that is oftentimes referred to as a tape head array.

In operation, the tape drive system has many moving parts such as a tape that moves between two reels. In between the two reels, the tape rolls over numerous rollers guiding the tape to a reading or writing position in front of the head. Individually, the moving parts are of little significance, but collectively, the numerous moving parts can create quite a significant movement of the tape drive, such as shock and vibration of the tape drive, which creates an unstable tape drive.

Therefore, there is a need in the art for an improved tape drive that have improved stability.

SUMMARY OF THE DISCLOSURE

The present disclosure generally relates to a lock mechanism for a tape embedded drive. The tape embedded drive comprises an enclosure enclosing a first tape reel, a second tape reel, and a lock mechanism. The first tape reel comprises a first gear, the second tape reel comprises a second gear, and the lock mechanism is disposed between the first and second gears. The lock mechanism comprises a latch lock, one or more latch tips disposed at a first end of the latch lock, a magnet disposed at a second end of the latch lock, and an electromagnet disposed adjacent to the magnet. When the electromagnet is activated, the latch lock moves to an unlocked position. When the electromagnet is de-activated, the latch lock moves to a locked position where the one or more latch tips are in contact with the first and second gears.

In one embodiment, a storage device comprises a first tape reel comprising a first gear, a second tape reel disposed adjacent to the first tape reel, the second tape reel comprising a second gear, and a lock mechanism disposed between the first gear and the second gear. The lock mechanism comprises a latch lock movable from a first position to a second position, a magnet coupled to the latch lock, and an electromagnet disposed adjacent to the magnet.

In another embodiment, a storage device comprises a lock plate comprising a first surface and a second surface disposed perpendicular to the first surface, a first tape reel disposed at least partially over the first surface of the lock plate, a latch lock coupled to the first surface of the lock plate, the latch lock movable from a first position disposed in contact with the first tape reel to a second position spaced from the first tape reel, a magnet coupled to the latch lock, and an electromagnet disposed on the second surface of the lock plate adjacent to the magnet.

In another embodiment, a storage device comprises an enclosure, a first tape reel comprising a first gear disposed within the enclosure, a second tape reel disposed within the enclosure adjacent to the first tape reel, the second tape reel comprising a second gear, and means for locking the first tape reel and the second tape reel disposed within the enclosure. The means for locking comprises a latch lock movable from a first position to a second position, a magnet coupled to the latch lock, an electromagnet disposed adjacent to the magnet, and means for activating the electromagnet.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6B illustrate a storage device in the unlocked state, according to some embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a lock mechanism for a tape embedded drive. The tape embedded drive comprises an enclosure enclosing a first tape reel, a second tape reel, and a lock mechanism. The first tape reel comprises a first gear, the second tape reel comprises a second gear, and the lock mechanism is disposed between the first and second gears. The lock mechanism comprises a latch lock, one or more latch tips disposed at a first end of the latch lock, a magnet disposed at a second end of the latch lock, and an electromagnet disposed adjacent to the magnet. When the electromagnet is activated, the latch lock moves to an unlocked position. When the electromagnet is de-activated, the latch lock moves to a locked position where the one or more latch tips are in contact with the first and second gears.

Figure 1A:
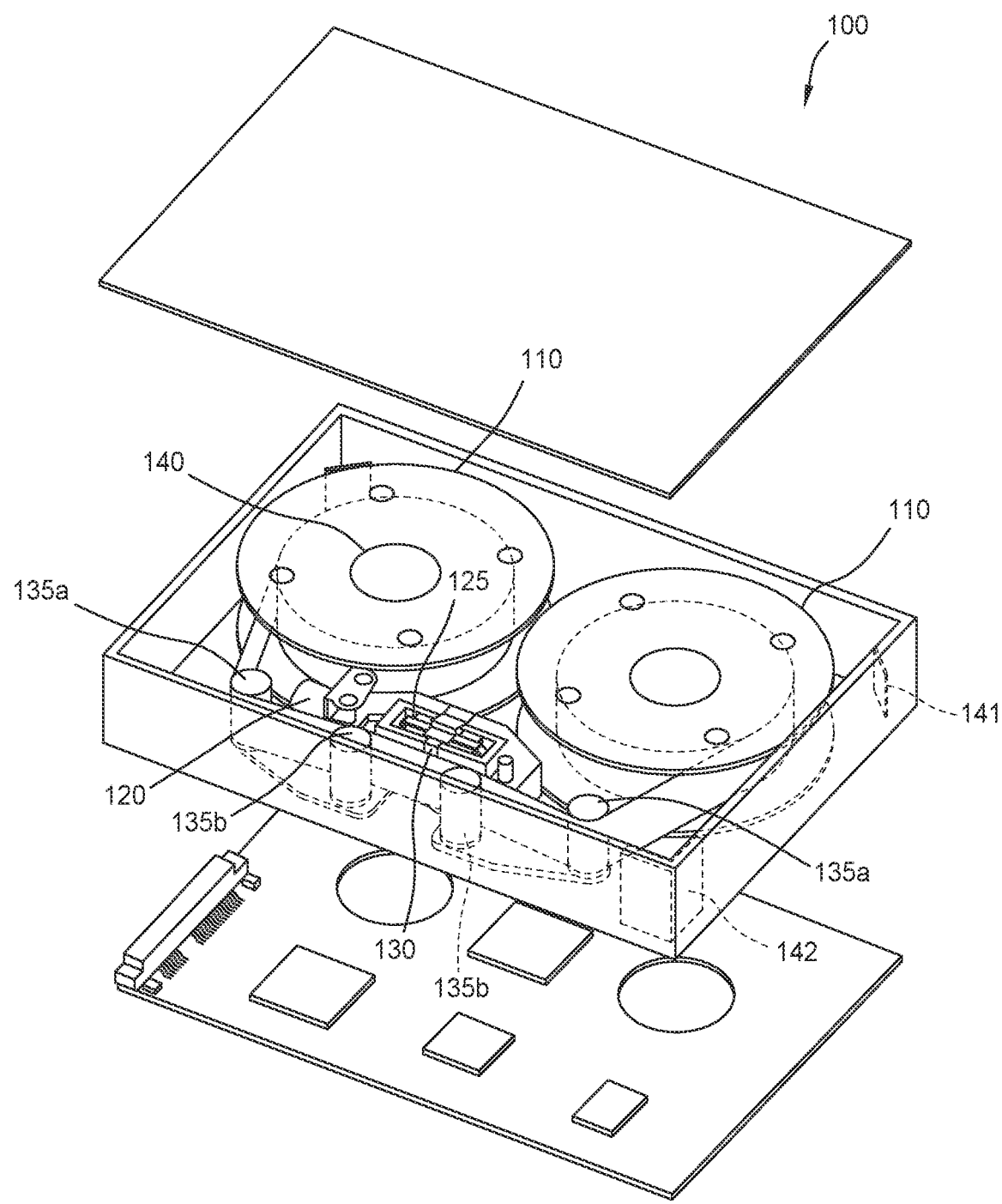
FIGS. 1A-1C illustrate a perspective exploded view and a simplified top down and side profile view of a tape embedded drive, in accordance with some embodiments.
Figure 1B:
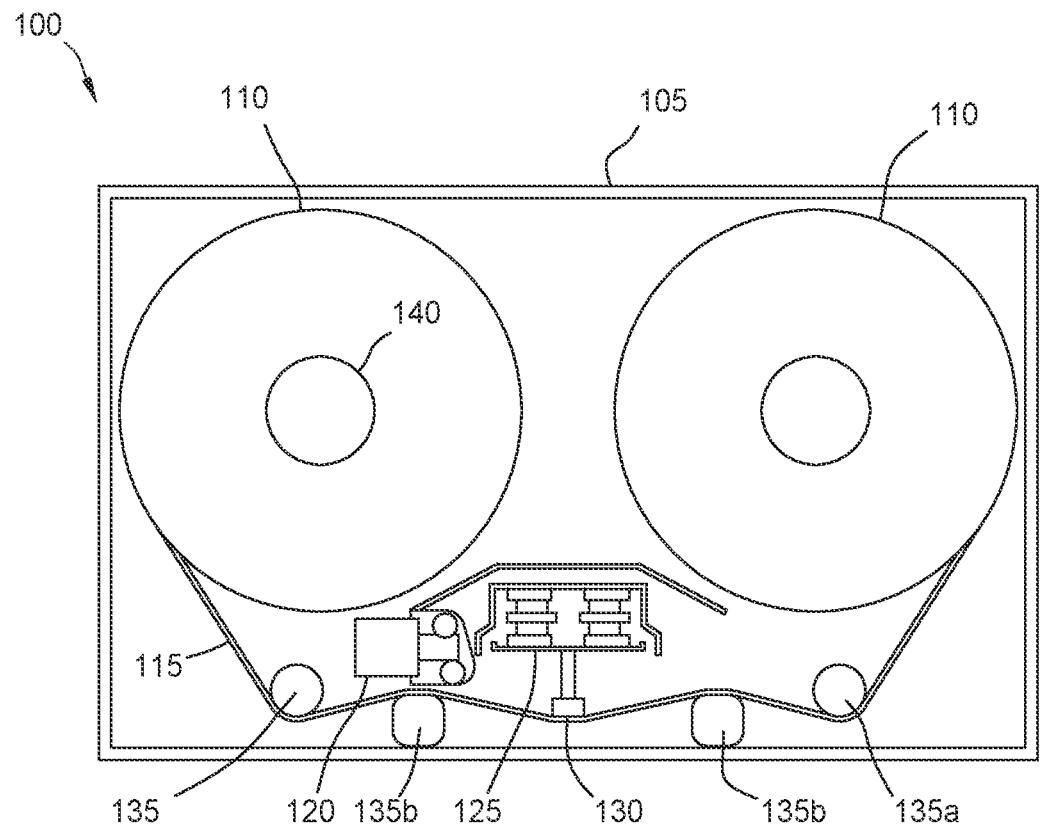
Figure 1C:
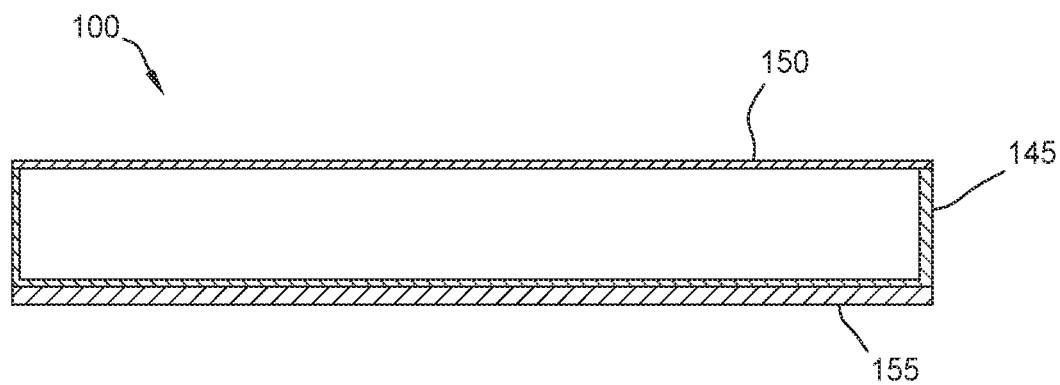

FIGS. 1A-1C illustrate a perspective exploded view and a simplified top down and side profile view of a tape embedded drive, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape medial 15 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two functional rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
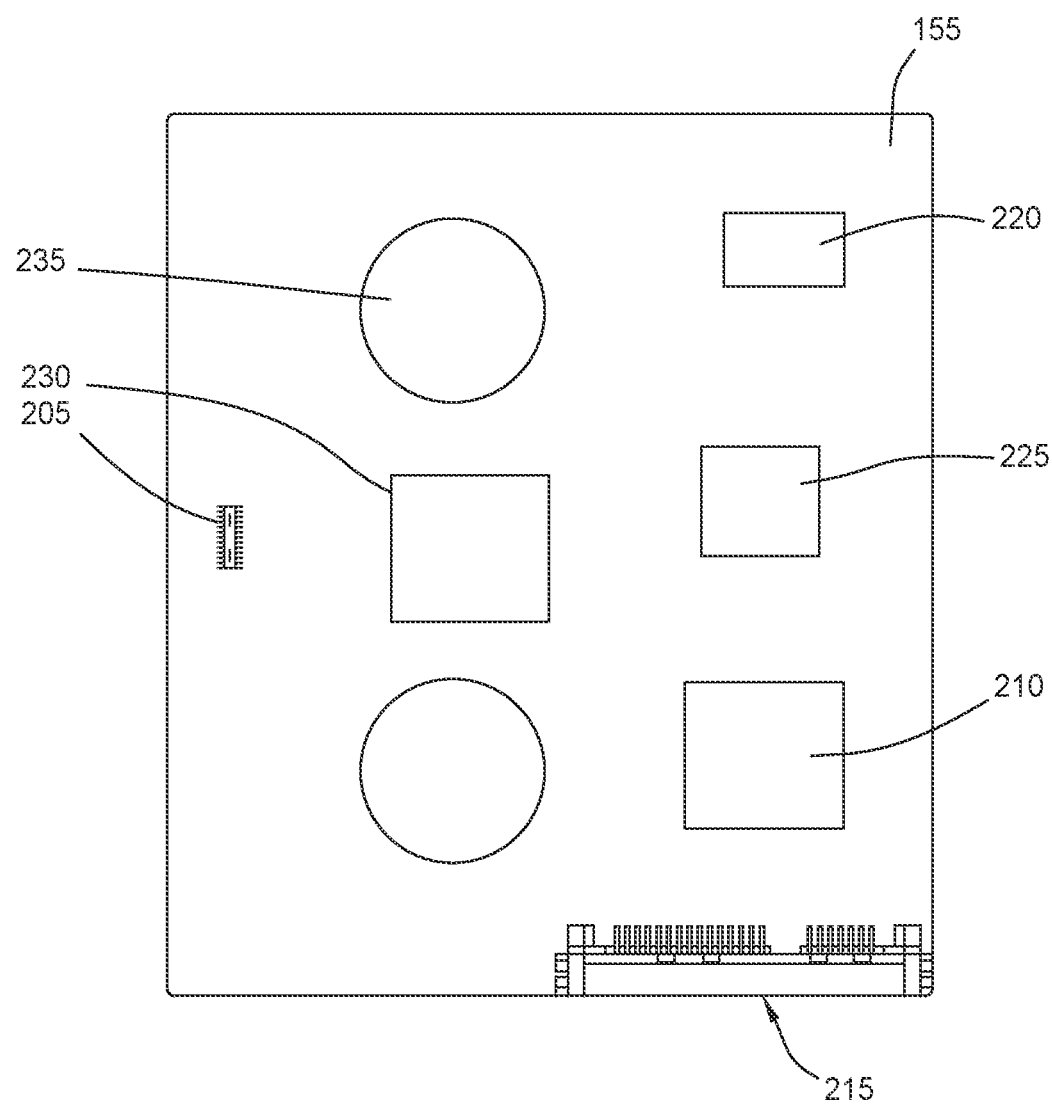
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

While the above discusses the tape embedded drive 100 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs. Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 3:
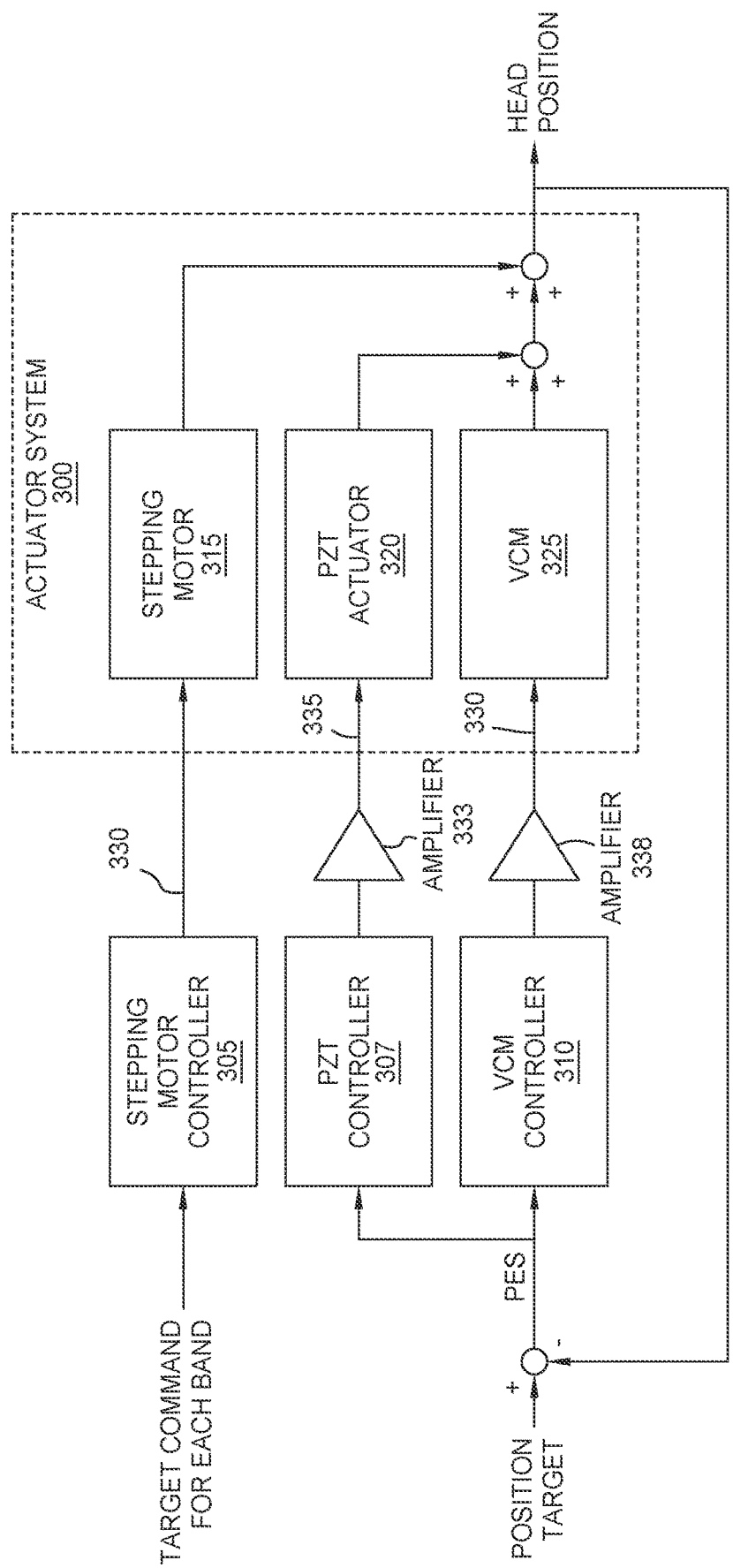
FIG. 3 illustrates a control block diagram for a servo-mechanical system of the tape embedded drive, in accordance with some embodiments.

FIG. 3 illustrates a control block diagram for a servo-mechanical system 300 of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 µm. In this embodiment, the various strokes creates a movement ratio of about 30,000:10,000:1 (stepping motor:VCM:PZT actuator). In other embodiments, the ratios may be different based on the performance specifications of the motors and the actuators.

A first control signal 330 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

Figure 4A:
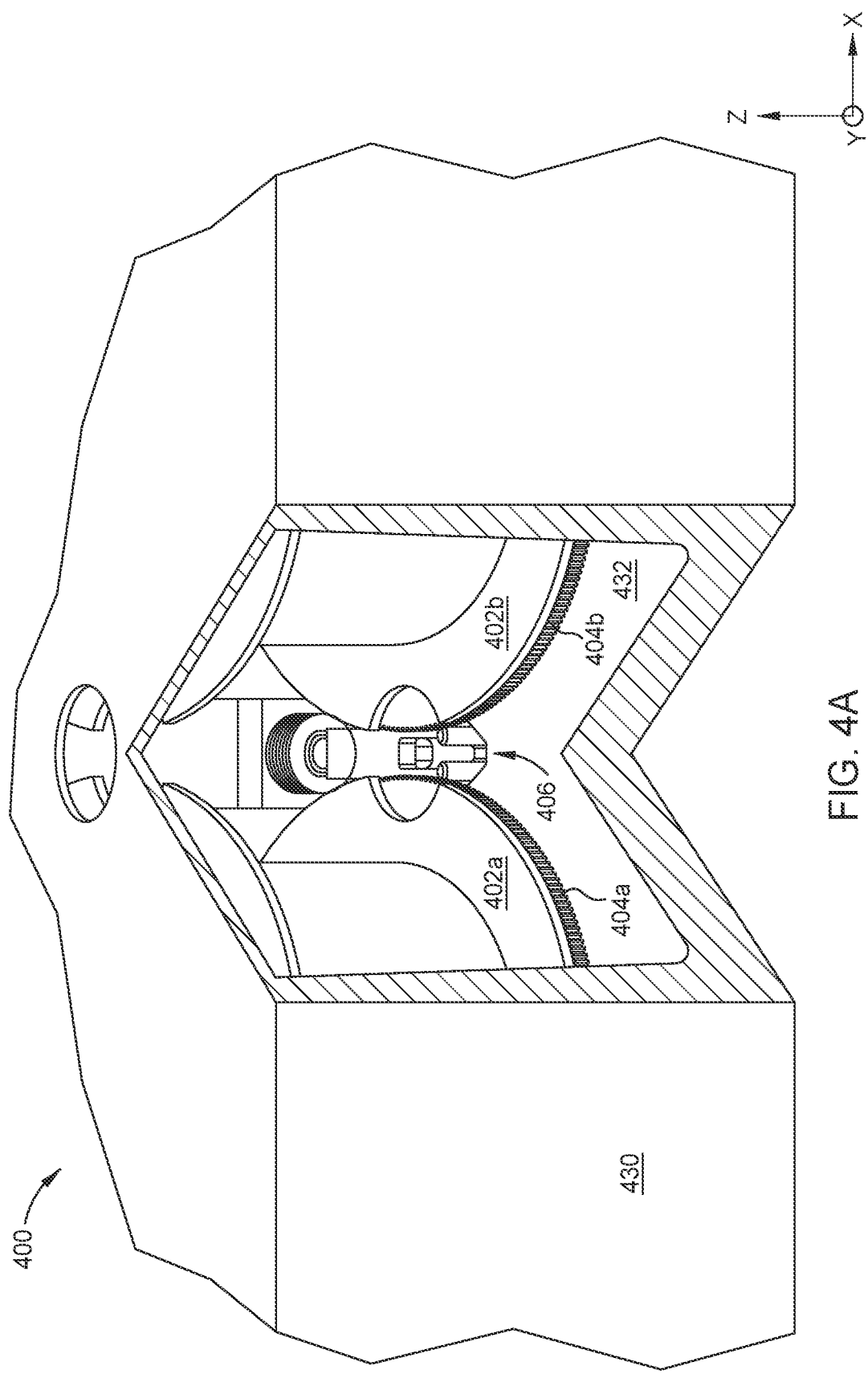
FIGS. 4A-4B illustrate perspective views of a storage device comprising an enclosed lock mechanism, according to various embodiments.
Figure 4B:
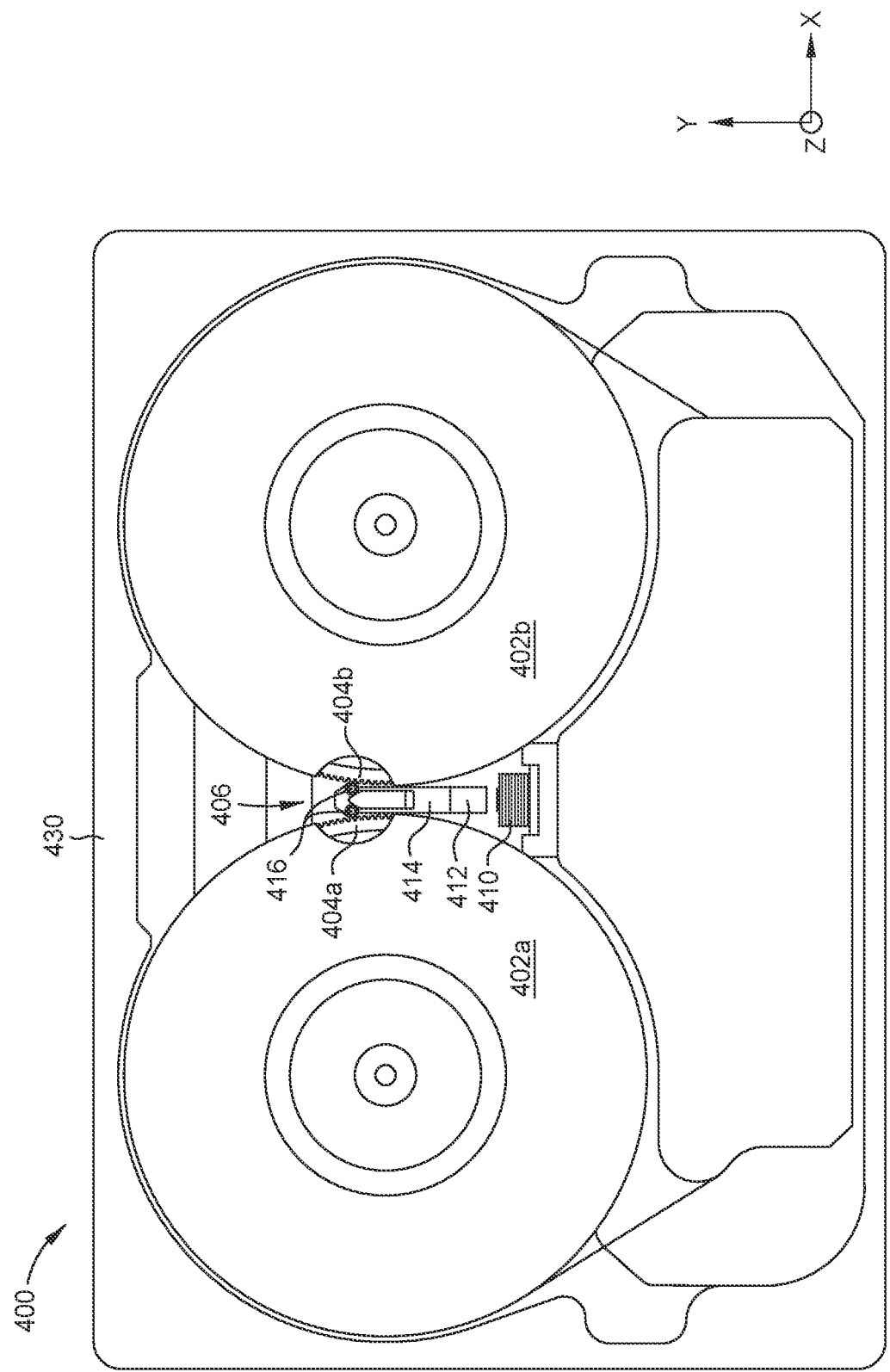

FIGS. 4A-4B illustrate perspective views of a storage device 400 comprising an enclosed lock mechanism 406, according to various embodiments. FIG. 4A is a side perspective view of the storage device 400, where a portion of the enclosure 430 is removed to illustrate the lock mechanism. The storage device 400 may be a tape embedded drive. As shown in FIG. 4A, the storage device 400 comprises an enclosure 430. A first tape reel 402a and a second tape reel 402b are disposed within the enclosure 430. The first tape reel 402a comprises a first gear 404a disposed over an interior surface 432 of the enclosure 430, and the second tape reel 402b comprises a second gear 404b disposed over the interior surface 432 of the enclosure 430. The lock mechanism 406 is disposed between the first and second gears 404a, 404b of the first and second tape reels 402a, 402b over the interior surface 432 of the enclosure 430. As such, the first and second tape reels 402a, 402b, the first and second gears 404a, 404b, and the lock mechanism 406 are all fully enclosed within the enclosure 430. While two tape reels 402a, 402b and two gears 404a, 404b are shown, some embodiments may include only one tape reel and one gear. As such, the number of tape reels and gears is not intended to be limiting.

FIG. 4B is a top section view of the interior the storage device 400, where a portion of the first and second tape reels 402a, 402b are removed to show the first and second gears 404a, 404b below. The lock mechanism 406 comprises an electromagnet 410, a magnet 412, and a latch lock 414. In some embodiments, the electromagnet 410 comprises a coil of wire connected to a power source or current source, such as a drive circuit. The latch lock 414 comprises one or more latch tips 416 for engaging the first and second gears 404a, 404b, as described below. The latch lock 414 is configured to move in a first direction (i.e., the −y-direction) towards the electromagnet 410 to lock the first and second tape reels 402a, 402b, and to move in a second direction (i.e., the y-direction) opposite the first direction to unlock the first and second tape reels 402a, 402b. The lock mechanism 406 may be in the locked state when the storage device 400 is powered off, and may be in the unlocked state when the storage device 400 is on and functioning.

The electromagnet 410 is coupled to a power supply or circuit (not shown) to activate and de-activate (e.g., provide power to) the electromagnet 410, which causes the latch lock 414 to move in the first and second directions to switch between the locked and unlocked states. In some embodiments, the power supply or circuit is enclosed with the enclosure 430. In other embodiments, the power supply or circuit source is disposed outside of the enclosure 430. In the locked position, the magnet 412 is disposed near the electromagnet 410 such that the magnet 412 is spaced a first distance of about 0.4 mm of less from the electromagnet 410, and the one or more latch tips 416 contact the first and second gears 404a, 404b. In the unlocked position, the magnet 412 is spaced from the electromagnet 410 by a second distance of about 0.4 mm to about 0.8 mm, and the one or more latch tips 416 are spaced from the first and second gears 404a, 404b. As shown in FIG. 4B, the lock mechanism 406 is in the unlocked position.

Figure 5A:
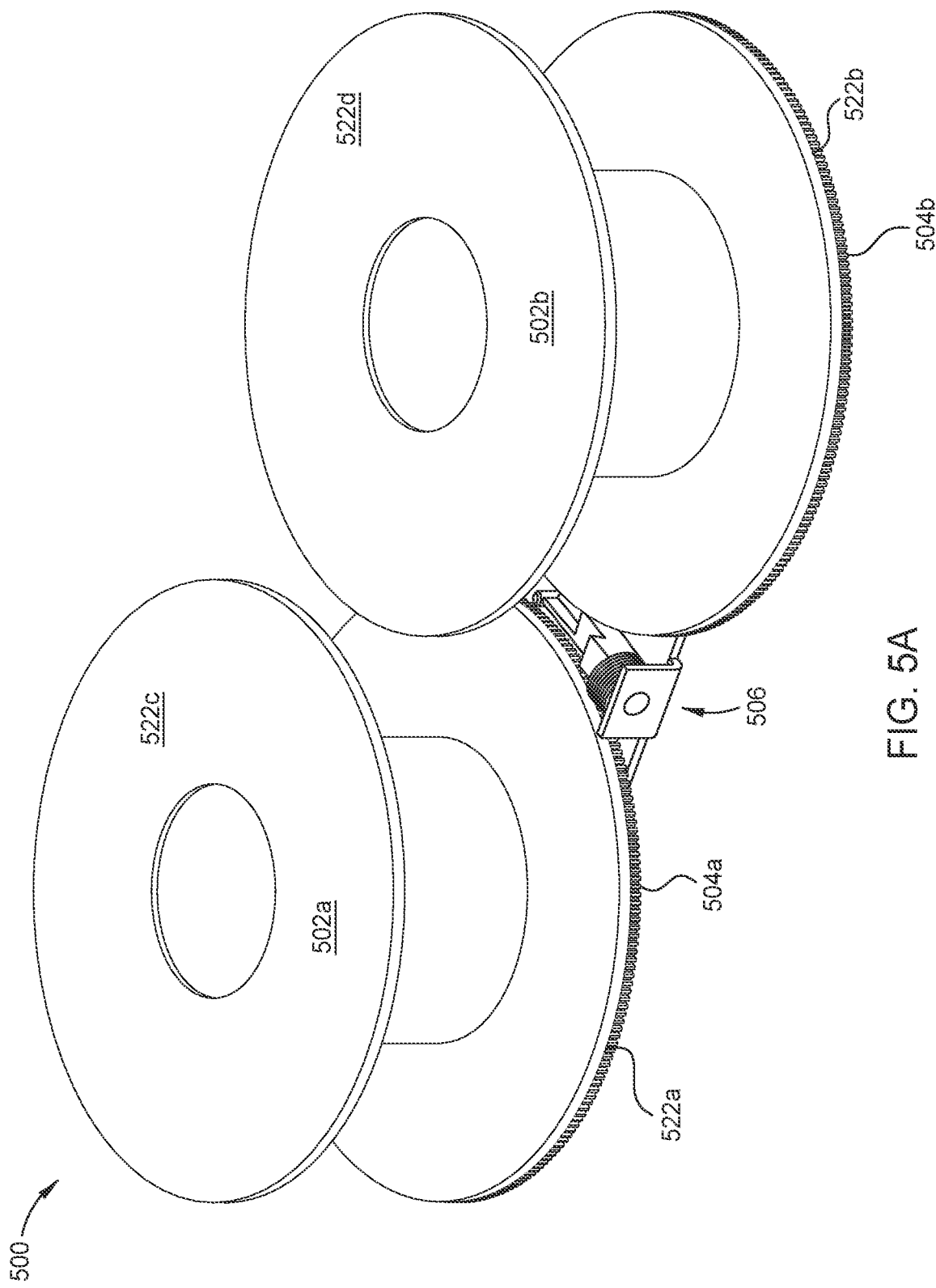
FIG. 5A illustrates a perspective view of a storage device comprising a lock mechanism, according to various embodiments.
Figure 5B:
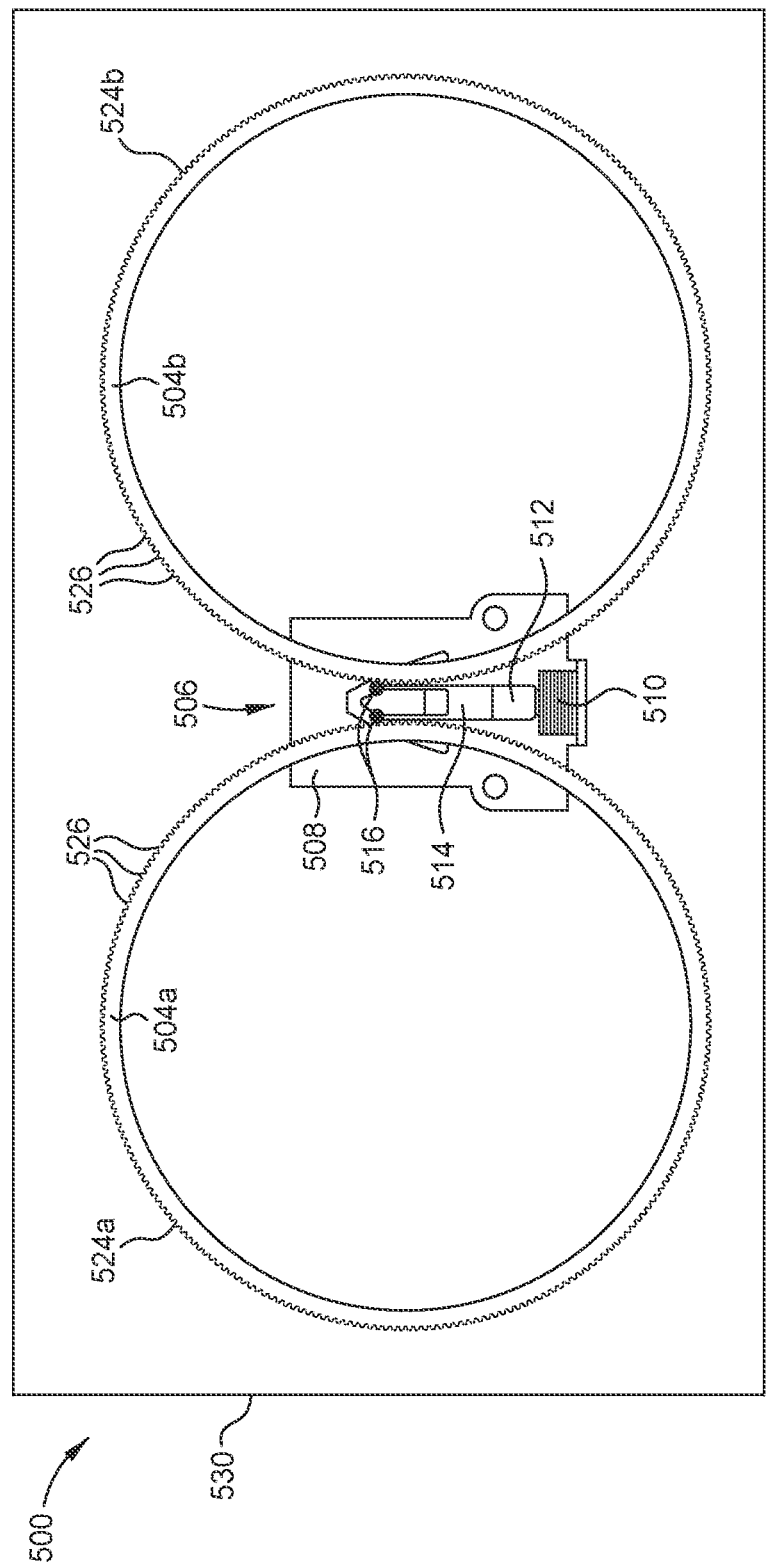
FIG. 5B illustrates a top view of the lock mechanism disposed between a first gear and a second gear, according to some embodiments.

FIG. 5A illustrates a perspective view of a storage device 500 comprising a lock mechanism 506, according to various embodiments. FIG. 5A illustrates a first tape reel 502a and a second tape reel 502b of the storage device 500, according to some embodiments. FIG. 5B illustrates a top view of the lock mechanism 506 disposed between a first gear 504a and a second gear 504b, according to some embodiments. The storage device 500 may be a tape embedded drive. The storage device 500 comprising the lock mechanism 506 may be the storage device 400 comprising the lock mechanism 406.

The first tape reel 502a comprises a first gear 504a disposed on a first surface 522a, and the second tape reel 502b comprises a second gear 504b disposed on a first surface 522b. The first surface 522a of the first tape reel 502a is disposed opposite to a second surface 522c of the first tape reel 502a. Similarly, the first surface 522b of the second tape reel 502b is disposed opposite to a second surface 522d of the second tape reel 502b. The first and second surfaces 522a, 522c of the first tape reel 502a are interchangeable such that the first gear 504a may be disposed on either surface 522a, 522c. Likewise, the first and second surfaces 522b, 522d of the second tape reel 502b are interchangeable such that the second gear 504b may be disposed on either surface 522b, 522d. While two tape reels 502a, 502b and two gears 504a, 504b are shown, some embodiments may include only one tape reel and one gear. As such, the number of tape reels and gears is not intended to be limiting.

The lock mechanism 506 is disposed between the first and second gears 504a, 504b of the first and second tape reels 502a, 502b. As shown in FIG. 5B, the first and second tape reels 502a, 502b, the first and second gears 504a, 504b, and the lock mechanism 506 are disposed within an enclosure 530. The lock mechanism 506 comprises a lock plate 508. A latch lock 514 and an electromagnet 510 are coupled to the lock plate 508. The first and second gears 504a, 504b of the first and second tape reels 502a, 502b are disposed at least partially over the lock plate 508 and latch lock 514. A magnet 512 is coupled to the latch lock 514. In some embodiments, the magnet 512 is disposed or partially enclosed within the latch lock 514.

The magnet 512 is disposed adjacent to the electromagnet 510. The electromagnet 510 is coupled to a power supply or circuit (not shown) to activate and de-activate (e.g., provide power to) the electromagnet 510, which causes the latch lock 514 to move in the first and second directions to switch between the locked and unlocked states. For example, when the electromagnet 510 is activated or powered by the power source or circuit, the electromagnet 510 repels the magnet 512, moving the latch lock 514 to the unlocked position. When the electromagnet 510 is de-activated or not powered, the latch lock 514 moves to the locked position. In some embodiments, the electromagnet 510 comprises a coil of wire connected to the power source or current source. In some embodiments, the power supply or circuit is enclosed with the enclosure 530. In other embodiments, the power supply or circuit is disposed outside of the enclosure 530.

The latch lock 514 further comprises one or more latch tips 516 for engaging with the first and second gears 504a, 504b. The first and second gears 504a, 504b each comprise a plurality of teeth 526 disposed on the outer diameter 514a, 514b, respectively. When the lock mechanism 506 is in the locked position, the one or more latch tips 516 contact the teeth 526 of the first and second gears 504a, 506b, preventing the first and second gears 504a, 504b, and thus the first and second tape reels 502a, 502b, from rotating. In embodiments having only one tape reel and one gear, the latch lock 514 may comprise only one latch tip 516 for engaging the gear. When the lock mechanism 506 is in the unlocked position, the one or more latch tips 516 are spaced from the teeth 526 of the first and second gears 504a, 504b, allowing the first and second gears 504a, 504b, and thus the first and second tape reels 502a, 502b, to rotate. The lock mechanism 506 may be in the locked state when the storage device 500 is powered off, and may be in the unlocked state when the storage device 500 is on and functioning.

Figure 6D:
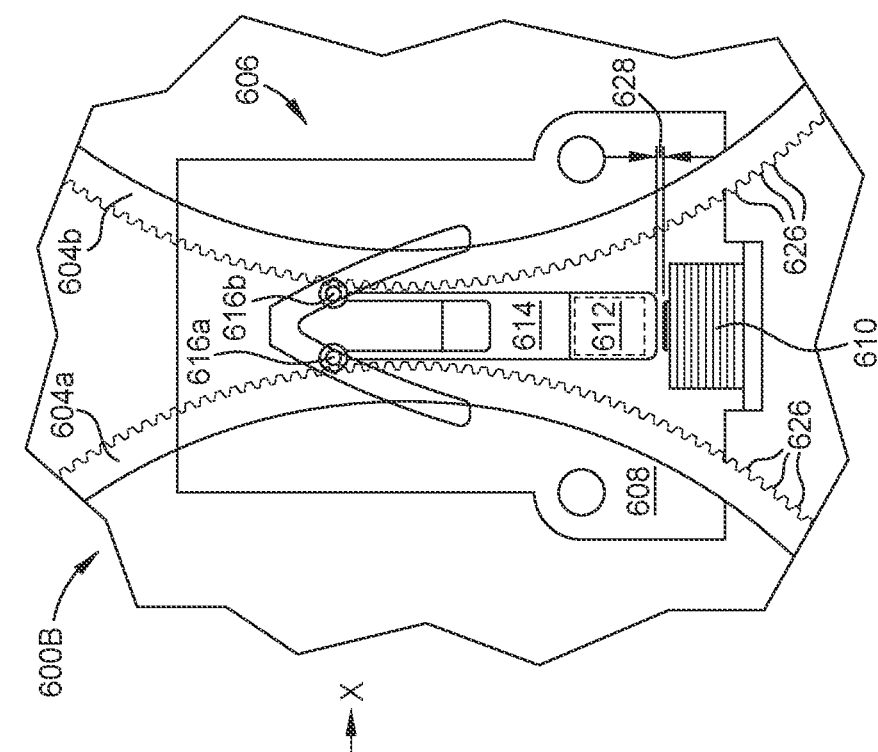
FIGS. 6C-6D illustrate a storage device in the locked state, according to some embodiments.
Figure 6C:
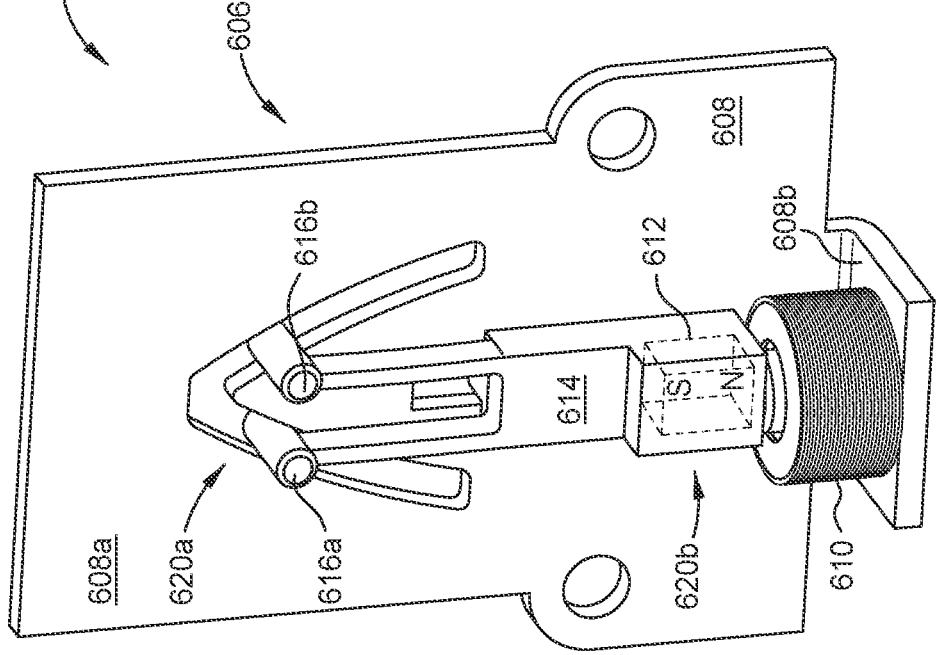

FIGS. 6A-6B illustrate a storage device 600A in the unlocked state, according to some embodiments. FIGS. 6C-6D illustrate a storage device 600A in the locked state, according to some embodiments. The storage devices 600A, 600B may be tape embedded drives. The storage devices 600A, 600B of FIGS. 6A-6D may be the same storage device in different locking states. As such, the storage devices 600A, 600B may be collectively referred to as the storage device 600. Additionally, the storage devices 600A, 600B of FIGS. 6A-6D may be the storage device 400 comprising the lock mechanism 406 of FIGS. 4A-5B or the storage device 500 comprising the lock mechanism 506 of FIGS. 5A-5B.

Specifically, FIGS. 6A and 6C illustrate perspective views of the storage device 600, and FIGS. 6B and 6D illustrate top views of the storage device 600. Moreover, FIGS. 6A and 6C illustrate the lock mechanism 606 alone, and FIGS. 6B and 6D illustrate the lock mechanism 606 disposed between the first and second gears 604a, 604b. The enclosure and first and second tape reels are not shown in FIGS. 6A-6D for clarity. However, the first and second gears 604a, 604b are coupled to first and second tape reels, respectively, and the first and second gears 604a, 604b and the lock mechanism 606 are fully enclosed within an enclosure. While two gears 604a, 604b are shown, some embodiments may include only one tape reel and one gear. As such, the number of tape reels and gears is not intended to be limiting.

The lock mechanism 606 of FIGS. 6A-6D comprise a lock plate 608. A latch lock 614 is coupled to a first surface 608a of the lock plate 608, and an electromagnet 610 is coupled to a second surface 608b of the lock plate 608 disposed perpendicular to the first surface 608a. The latch lock 614 comprises one or more latch tips 616a, 616b disposed on a first end 620a of and a magnet 612 disposed on a second end 620b opposite the first end 620a. The magnet 612 may be disposed or partially enclosed within the latch lock 614, like shown in FIGS. 6A-6D. The electromagnet 610 is disposed adjacent to the magnet 612 and the second end 620b of the latch lock 614. The electromagnet 610 is coupled to a power supply or circuit (not shown) to activate and de-activate (e.g., provide power to) the electromagnet 610. The electromagnet 510 may comprise a coil of wire connected to the power source or current source. In some embodiments, the power supply or circuit is enclosed with the enclosure, such as the enclosure 430 of FIGS. 4A-4B. In other embodiments, the power supply or circuit is disposed outside of the enclosure.

As shown in FIGS. 6A-6D, and the one or more latch tips 616a, 616b are two latch tips 616a, 616b. A first latch tip 616a is configured to engage with a first gear 604a of a first tape reel (not shown), such as the first tape reel 502a of FIG. 5A, and a second latch tip 616b is configured to engage with a second gear 604b of a second tape reel (not shown), such as the second tape reel 502b of FIG. 5A. In some embodiments, the one or more latch tips 616a, 616b are rounded. In such embodiments, the rounded latch tips 616a, 616b help prevent excessive force from being exerted on the latch tips 616a, 616b during emergency power off and during locking of the gears 604a, 604b. While two latch tips 616a, 616b are shown, a greater number or a lesser number of latch tips may be utilized. Thus, the number of latch tips 616a, 616b is not intended to be limiting.

The magnet 612 and the electromagnet 610 each individually comprise a north pole (N) and a south pole (S). In some embodiments, the north pole of the magnet 612 is disposed adjacent to the north pole of the electromagnet 610. In other embodiments, the south pole of the magnet 612 is disposed adjacent to the south pole of the electromagnet 610. When current is provided to the electromagnet 610 through a power supply or circuit (not shown), the electromagnet 610 is activated to repel the magnet 612. As such, the magnet 612 being repelled moves the latch lock 614 in a first direction (i.e., the y-direction) to unlock and disengage the one or more latch tips 616a, 616b from the teeth 626 of the first and second gears 604a, 604b. When the latch lock 614 is in the unlocked state, the magnet 612 is spaced from the electromagnet 610 by a first distance 618 of about 0.4 mm to about 0.8 mm.

When current is not provided to the electromagnet 610, the electromagnet 610 is de-activated, allowing the magnet 612 to near the electromagnet 610 without coming into direct contact. For example, when the electromagnet 610 is deactivated, the electromagnet 610 and the magnet 612 are spaced a second distance 628 of about 0.4 mm or less from one another. When the electromagnet 610 is de-activated or unpowered, the latch lock 614 moves in a second direction (i.e., the −y-direction) opposite to the first direction to lock the first and second gears 604a, 604b. To lock the first and second gears 604a, 604b, the one or more latch tips 616a, 616b contact the teeth 626 of the first and second gears 604a, 604b, preventing the first and second gears 604a, 604b, and thus the first and second tape reels 602a, 602b, from rotating.

When the latch lock 614 moves from the unlocked state to the locked state, or vice versa, the latch lock 614 moves a first distance 618 of about 0.4 mm to about 0.8 mm such that the electromagnet 610 is spaced from the magnet 612 by a distance of about 0.4 mm to about 0.8 mm. The first distance 618 is greater than the second distance 628. The latch lock 614 moves from the first distance 618 to the second distance 628 in a first direction (e.g., the y-direction) when switching from the locked position to the unlocked position, and moves from the second distance 628 to the first distance 618 in a second direction opposite to the first direction (e.g., the −y-direction) when switching from the unlocked position to the locked position.

In the unlocked state shown in FIGS. 6A-6B, the first and second gears 604a, 604b, and thus the first and second tape reels 602a, 602b, rotate unhindered by the lock mechanism 606. In the locked state shown in FIGS. 6C-6D, the first and second gears 604a, 604b, and thus the first and second tape reels 602a, 602b, are prevented from rotating, effectively locking the first and second tape reels 602a, 602b. The lock mechanism 606 may be in the locked state when the storage device 600 is powered off, and may be in the unlocked state when the storage device 600 is on and functioning.

By utilizing a lock mechanism enclosed within a storage device, the internal environment of the storage device can be sealed and maintained. Further, enclosing or embedding the lock mechanism within the enclosure mechanically isolates the lock mechanism from the exterior of the storage device. Moreover, including one or more rounded latch tips in the lock mechanism to contact the gears enables the lock mechanism to prevent excessive force from being exerted on the lock mechanism during emergency power off and during locking of the gears of the tape reels. As such, there is a lower chance of damage occurring to the lock mechanism.

In one embodiment, a storage device comprises a first tape reel comprising a first gear, a second tape reel disposed adjacent to the first tape reel, the second tape reel comprising a second gear, and a lock mechanism disposed between the first gear and the second gear. The lock mechanism comprises a latch lock movable from a first position to a second position, a magnet coupled to the latch lock, and an electromagnet disposed adjacent to the magnet.

The latch lock comprises a first end and a second end opposite the first end. The latch lock comprises one or more latch tips disposed on the first end, and the magnet is disposed on the second end. The one or more latch tips of the latch lock are rounded. The one or more latch tips of the latch lock are in contact with the first and second gears in the first position and spaced from the first and second gears in the second position. The electromagnet is activated to an on state when the latch lock is in the second position. The electromagnet is de-activated to an off state when the latch lock in the first position. The electromagnetic is spaced a first distance from the magnet when the latch lock is in the second position. The electromagnet is spaced a second distance greater than the first distance from the magnet when the latch lock is in the first position. The storage device further comprises an enclosure. The first tape reel, the second tape reel, and the lock mechanism are disposed within the enclosure.

In another embodiment, a storage device comprises a lock plate comprising a first surface and a second surface disposed perpendicular to the first surface, a first tape reel disposed at least partially over the first surface of the lock plate, a latch lock coupled to the first surface of the lock plate, the latch lock movable from a first position disposed in contact with the first tape reel to a second position spaced from the first tape reel, a magnet coupled to the latch lock, and an electromagnet disposed on the second surface of the lock plate adjacent to the magnet.

The electromagnet is activated to attract the magnet when the latch lock is in the second position. The electromagnet is de-activated to repel the magnet when the latch lock is in the first position. The storage device further comprises an enclosure. The first tape reel, the latch lock, the magnet, and the electromagnet are enclosed within the enclosure. The first tape reel comprises a first gear, and the latch lock is disposed in contact with the first gear in the first position. The latch lock comprises one or more rounded latch tips, the one or more rounded latch tips being in contact with the first gear in the first position. The latch lock comprises a first end and a second end opposite the first end. The one or more latch tips are disposed on the first end the magnet is disposed on the second end. The electromagnet and the magnet are spaced a distance of about 0.4 mm to about 0.8 mm when the latch lock is in the first position. The electromagnet and the magnet are spaced a second distance of about 0.4 mm or less when the latch lock is in the second position.

In another embodiment, a storage device comprises an enclosure, a first tape reel comprising a first gear disposed within the enclosure, a second tape reel disposed within the enclosure adjacent to the first tape reel, the second tape reel comprising a second gear, and means for locking the first tape reel and the second tape reel disposed within the enclosure. The means for locking comprises a latch lock movable from a first position to a second position, a magnet coupled to the latch lock, an electromagnet disposed adjacent to the magnet, and means for activating the electromagnet.

The latch lock is in contact with the first and second gears in the first position and spaced from the first and second gears in the second position. The means for activating the electromagnet switches the electromagnetic to an on state to attract the magnet when the latch lock is in the second position. The means for activating the electromagnet switches the electromagnet to an off state to repel the magnet when the latch lock is in the first position. The latch lock moves a distance of about 0.4 mm to about 0.8 mm when moving from the first position to the second position. The means for locking is disposed between the first and second tape reels. The means for locking further comprises a lock plate. The latch lock, the magnet, and the electromagnet are coupled to the lock plate. The first gear is disposed on a first surface of the first tape reel, the second gear is disposed on a first surface of the second tape reel, and the first and second gears are disposed adjacent to the lock plate.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
a first tape reel comprising a first gear;
a second tape reel disposed adjacent to the first tape reel, the second tape reel comprising a second gear; and
a lock mechanism disposed between the first gear and the second gear, the lock mechanism comprising:
a latch lock movable from a first position to a second position;
a magnet coupled to the latch lock; and
an electromagnet disposed adjacent to the magnet.

2. The storage device of claim 1, wherein the latch lock comprises a first end and a second end opposite the first end, wherein the latch lock comprises one or more latch tips disposed on the first end, and wherein the magnet is disposed on the second end.

3. The storage device of claim 2, wherein the one or more latch tips of the latch lock are rounded.

4. The storage device of claim 2, wherein the one or more latch tips of the latch lock are in contact with the first and second gears in the first position and spaced from the first and second gears in the second position.

5. The storage device of claim 1, wherein the electromagnet is activated to an on state when the latch lock is in the second position, and wherein the electromagnet is de-activated to an off state when the latch lock in the first position.

6. The storage device of claim 1, wherein the electromagnetic is spaced a first distance from the magnet when the latch lock is in the second position, and wherein the electromagnet is spaced a second distance greater than the first distance from the magnet when the latch lock is in the first position.

7. The storage device of claim 1, further comprising an enclosure, wherein the first tape reel, the second tape reel, and the lock mechanism are disposed within the enclosure.

8. A storage device, comprising:
a lock plate comprising a first surface and a second surface disposed perpendicular to the first surface;
a first tape reel disposed at least partially over the first surface of the lock plate;
a latch lock coupled to the first surface of the lock plate, the latch lock movable from a first position disposed in contact with the first tape reel to a second position spaced from the first tape reel;
a magnet coupled to the latch lock; and
an electromagnet disposed on the second surface of the lock plate adjacent to the magnet.

9. The storage device of claim 8, wherein the electromagnet is activated to attract the magnet when the latch lock is in the second position, and wherein the electromagnet is de-activated to repel the magnet when the latch lock is in the first position.

10. The storage device of claim 8, further comprising an enclosure, the first tape reel, the latch lock, the magnet, and the electromagnet being enclosed within the enclosure, wherein the first tape reel comprises a first gear and the latch lock is disposed in contact with the first gear in the first position.

11. The storage device of claim 10, wherein the latch lock comprises one or more rounded latch tips, the one or more rounded latch tips being in contact with the first gear in the first position.

12. The storage device of claim 8, wherein the latch lock comprises a first end and a second end opposite the first end, wherein the one or more latch tips are disposed on the first end the magnet is disposed on the second end.

13. The storage device of claim 8, wherein the electromagnet and the magnet are spaced a first distance of about 0.4 mm to about 0.8 mm when the latch lock is in the first position, and wherein the electromagnet and the magnet are spaced a second distance of about 0.4 mm or less when the latch lock is in the second position.

14. A storage device, comprising:
an enclosure;
a first tape reel comprising a first gear disposed within the enclosure;
a second tape reel disposed within the enclosure adjacent to the first tape reel, the second tape reel comprising a second gear; and
means for locking the first tape reel and the second tape reel disposed within the enclosure, the means for locking comprising:
a latch lock movable from a first position to a second position;
a magnet coupled to the latch lock;
an electromagnet disposed adjacent to the magnet; and
means for activating the electromagnet.

15. The storage device of claim 14, wherein the latch lock is in contact with the first and second gears in the first position and spaced from the first and second gears in the second position.

16. The storage device of claim 14, wherein the means for activating the electromagnet switches the electromagnetic to an on state to attract the magnet when the latch lock is in the second position, and wherein the means for activating the electromagnet switches the electromagnet to an off state to repel the magnet when the latch lock is in the first position.

17. The storage device of claim 14, wherein the latch lock moves a distance of about 0.4 mm to about 0.8 mm when moving from the first position to the second position.

18. The storage device of claim 14, wherein the means for locking is disposed between the first and second tape reels.

19. The storage device of claim 14, wherein the means for locking further comprises a lock plate, and wherein the latch lock, the magnet, and the electromagnet are coupled to the lock plate.

20. The storage device of claim 19, wherein the first gear is disposed on a first surface of the first tape reel, the second gear is disposed on a first surface of the second tape reel, and the first and second gears are disposed adjacent to the lock plate.

* * * * *